Sept. 7, 1948.  B. B. K. MORSE  2,448,905
SELF-COMPENSATING GYRO ASSEMBLY

Filed April 9, 1947

INVENTOR
BRIAN B. K. MORSE
BY Chapin + Neal
ATTORNEYS

Patented Sept. 7, 1948

2,448,905

UNITED STATES PATENT OFFICE 2,448,905

SELF-COMPENSATING GYRO ASSEMBLY

Brian B. K. Morse, Holyoke, Mass.

Application April 9, 1947, Serial No. 740,433

4 Claims. (Cl. 74—5)

This invention relates to an improvement in gyro instruments and other gyro controlled devices. More particularly it relates to a novel gyro assembly and mounting having a general utility in such instruments and devices and in gyro controls generally.

The principal object of my invention is the substantial prevention of undesired precession due to unbalanced frictional and gravitational forces acting on the bearings, gimbals and other elements of the mounting.

The mass of a gyro in its reaction to the gravitational and centrifugal forces tends, when unbalanced, to seek an equilibrium of balance by precession. To perfectly balance the gyro is prohibitively costly and impractical as even the bearings would have to be balanced frictionally. Because it is practically impossible to perfectly balance a gyro with respect to its bearings, gimbals, and other mounting elements, various erecting mechanisms have been tried, such as pendulous vanes and speed balls but these have not, as far as I am aware, been successful in preventing this balance seeking precession.

To eliminate the reaction of unbalance seems the logical method of preventing undesired precession. However, eliminating this reaction necessitates dispersing a force which is as powerful as the centrifugal force of the gyro itself. Otherwise, direct opposition of this force would tend to stop the rotation of the gyro. According to the principle of operation of my invention, I disperse this force by means of a resultant system which applies a counter force equal to the original balance seeking precession. In other words, the precession is divided into forces opposing each other in a manner to give a resultant movement rather than a reactant movement.

In general I accomplish this by an assembly of an odd plurality of gyro-rotors supported in and by a common gimbal, the axes of rotation of the rotors lying in intersecting planes which are at right angles to the plane of the gimbal, and then driving all of the rotors at the same speed and in the same direction with respect to the center of the gimbal. Such an assembly is self-compensating for the unbalance caused by disturbing factors such as friction, structural defects, rotation of the earth or movements of the air-craft or other carrier in which the assembly is mounted.

Figure 1:
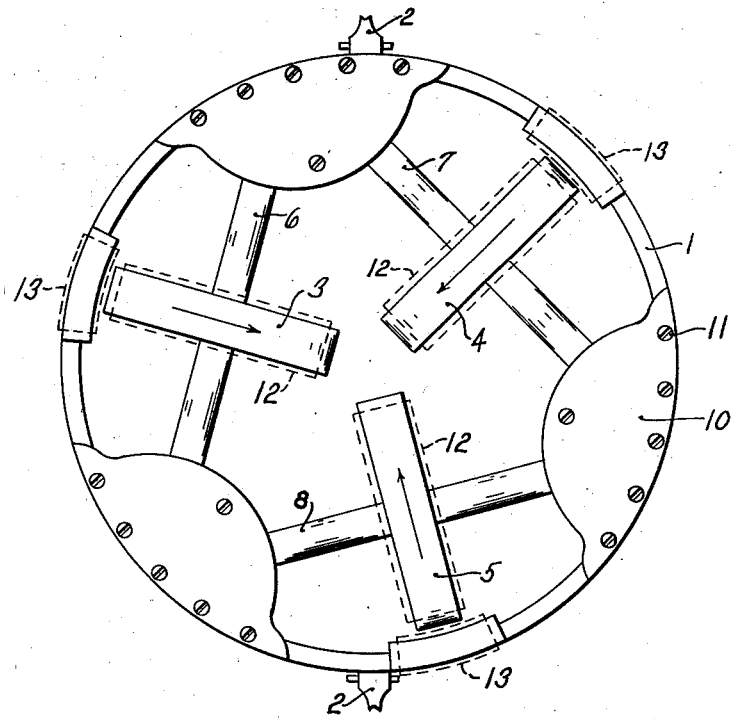

In the accompanying drawing Fig. 1 shows a plan view of a gyro assembly, parts being shown diagrammatically, which illustratively embodies my invention in an arrangement of three gyro-rotors.

Figure 2:
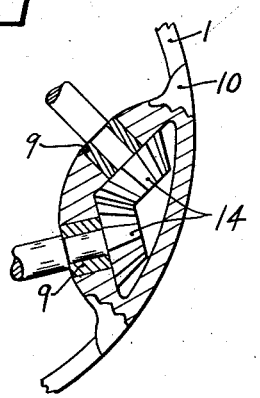

Fig. 2 is a detail view of a bearing arrangement, parts being broken away.

Referring to the drawing the base gimbal is shown at 1, the ring being provided with diametrically opposite gimbal bearings 2 for mounting in an outer or intermediate gimbal, not shown, in accordance with the design and purpose of the particular instrument in which the assembly is to be used. In the gimbal 1 are mounted three gyro-rotors indicated at 3, 4 and 5. The rotors are mounted 120 degrees apart on shafts 6, 7 and 8, respectively, which form a delta or triangle. The ends of the rotor shafts are mounted in suitable anti-friction bearings 9 supported by plates 10 secured by screws 11 to the gimbal ring 1. The rotors are unidirectionally driven with respect to the center of the base gimbal and at the same speed. The rotors may be driven by any suitable or usual means as for example by providing the rotors with armature coils, diagrammatically indicated in dotted lines at 12, which cooperate with stator coils, similarly indicated at 13, and carried by the base gimbal, the stators being series wound so that the three rotors run at the same speed. The rotor shafts may be provided with meshing bevel gears 14 as shown in Fig. 2 in which case two of the gyros may be driven from the third. Current is supplied to the rotor windings through usual ring contacts, not shown. The driving means may take various forms, the essential requirements being that the rotors be driven at substantially equal speeds in the same direction relative to the center of the base gimbal. Large deviations in speed will cause overpowering of the slower rotor.

By the described arrangement, as is apparent, the precession forces being 120 degrees apart cause a resultant motion toward the center of the assembly. It will be seen that an applied force tending to cause precession of one of the gyros will cause another precession in one or the other of the adjacent gyros with a resultant always in the direction of the center of gravitational movement. Thus precession is prevented by dissipation of the precessional forces.

While I have shown and described an arrangement of three rotors with their axes in triangular arrangement, the principle of my invention as previously pointed out is applicable to a corresponding arrangement of any odd plurality of rotors, that is any odd number of rotors greater than one. Whatever the number of the odd plurality of rotors used in the arrangement, the gyro assembly should be balanced structurally within reasonable manufacturing tolerances.

I claim:

1. A self-compensating gyro assembly which comprises an odd plurality of gyro-rotors mounted on shafts rotatably supported in and by a gimbal ring, the axes of said shafts forming an equilateral triangle, and means to simultaneously drive all of said rotors at the same speed and in the same direction.

2. A self-compensating gyro assembly which comprises an odd plurality of gyro-rotors mounted on shafts rotatably supported in and by a gimbal ring, the axes of said shafts forming an equilateral triangle, said rotors revolving in planes intersecting each other at equal angles within the confines of the triangle and means to simultaneously drive all of said rotors at the same speed and in the same direction.

3. A self-compensating gyro assembly which comprises an odd plurality of gyro-rotors mounted on shafts rotatably supported in and by a gimbal ring, the axes of said shafts forming an equilateral triangle, said rotors revolving in planes intersecting each other at equal angles and on a common line and means to simultaneously drive all of said rotors at the same speed and in the same direction.

4. A self-compensating gyro assembly which comprises an odd plurality of gyro-rotors mounted on shafts rotatably supported in and by a gimbal ring, the axes of said shafts forming an equilateral triangle, said rotors revolving in planes intersecting each other at equal angles within the confines of the triangle, each rotor being provided with an armature coil cooperating with series wound stator coils carried by the gimbal ring to drive the rotors at the same speed in the same direction.

BRIAN B. K. MORSE.

REFERENCES CITED

The following references are of record in the file of this patent:

FOREIGN PATENTS

| Number | Country | Date |
|---|---|---|
| 26,906 | Great Britain (1911) | Dec. 2, 1912 |